W. J. HICKEY.
CATTLE GUARD.
APPLICATION FILED JULY 10, 1913.

1,125,095.

Patented Jan. 19, 1915.
2 SHEETS—SHEET 1.

Inventor
W. J. Hickey.

W. J. HICKEY.
CATTLE GUARD.
APPLICATION FILED JULY 10, 1913.
1,125,095.
Patented Jan. 19, 1915.
2 SHEETS—SHEET 2.
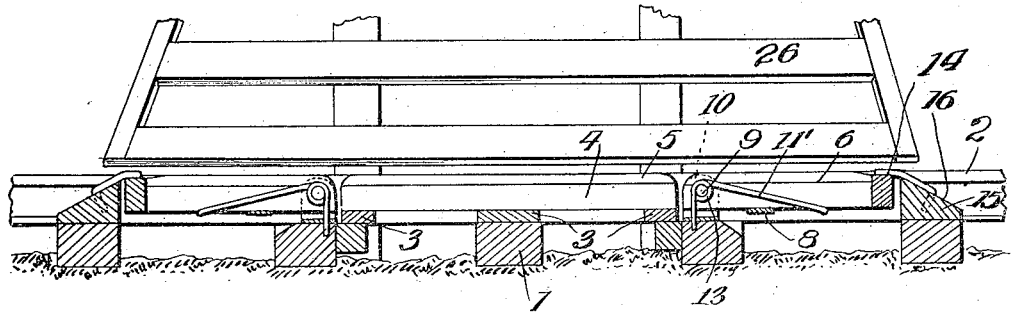
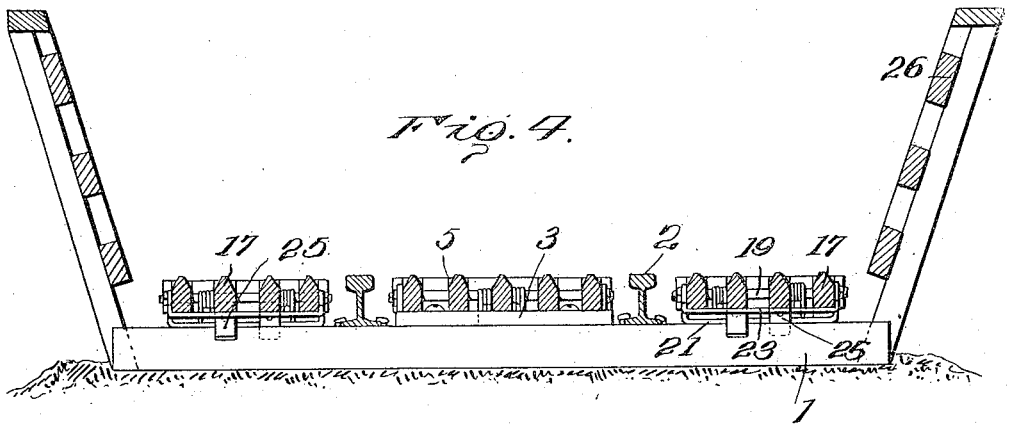
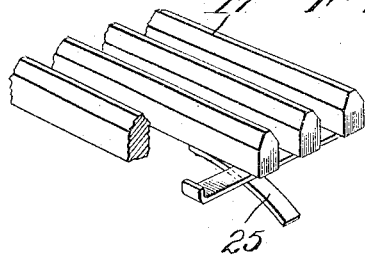
Inventor
W. J. Hickey

UNITED STATES PATENT OFFICE.

WILLIAM J. HICKEY, OF RENO, NEVADA.

CATTLE-GUARD.

1,125,095.  Specification of Letters Patent.  Patented Jan. 19, 1915.

Application filed July 10, 1913. Serial No. 778,340.

*To all whom it may concern:*

Be it known that I, WILLIAM J. HICKEY, citizen of the United States, residing at Reno, in the county of Washoe and State of Nevada, have invented certain new and useful Improvements in Cattle-Guards, of which the following is a specification.

This invention relates to cattle guards and aims to provide a guard which may be readily set up and which, while it will afford an unstable footing for an animal treading thereon, will not be liable to get out of order.

Another aim of the invention is to so construct the tread of the guard that it will yield in a downward direction when weight is imposed thereon and will be immediately returned to normal position as soon as relieved of the weight.

The invention also aims to so construct the guard that although its tread will yield in a downward direction when an animal's hoof is placed thereon, there will be no likelihood of the hoof being caught or injured.

Figure 1:
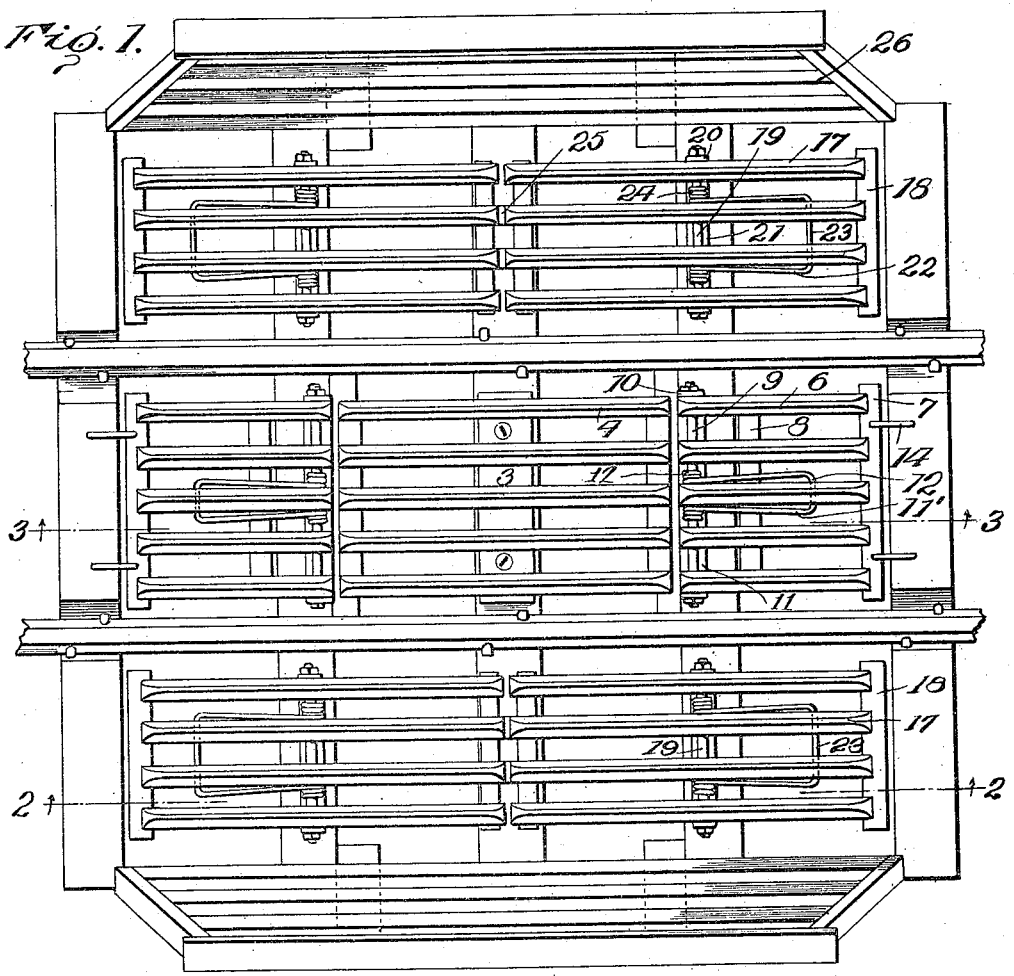
Figure 2:
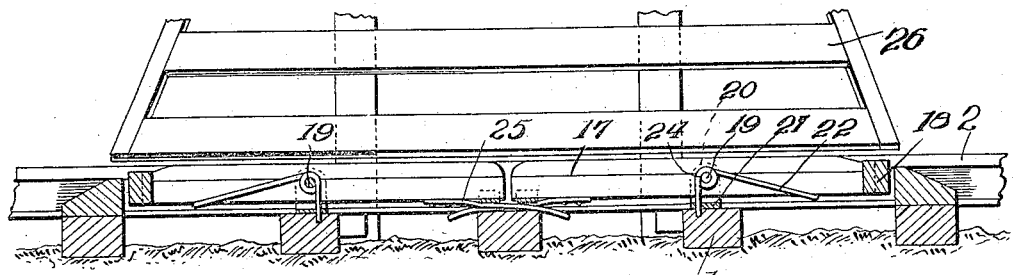

In the accompanying drawings: Figure 1 is a plan view of the guard embodying the present invention. Fig. 2 is a vertical sectional view on the line 2—2 of Fig. 1. Fig. 3 is a similar view on the line 3—3 of Fig. 1. Fig. 4 is a vertical transverse sectional view through the guard. Fig. 5 is a perspective view of a portion of one of the tread sections.

Corresponding and like parts are referred to in the following description and indicated in all the views of the accompanying drawings by the same reference characters.

In the drawings, the guard is illustrated as mounted upon a section of track, the ties of which are indicated by the numeral 1 and the rails by the numeral 2.

The guard consists essentially of a middle section and side sections, the middle or intermediate section being supported upon the ties between the rails, and the side sections being supported upon the ties outwardly of the rails. The intermediate tread section of the guard includes a fixed portion and yieldable portions, the fixed portion including attaching plates 3 which are secured upon the ties 1 by means of spikes or the like. Secured upon the attaching plates 3 are a number of tread bars 4 which have their upper edges beveled, as clearly shown in Fig. 4 of the drawings and as indicated at 5. These bars 4 extend in parallel relation with respect to each other and with respect to the rails 2 and they are spaced apart and from the rails preferaby a sufficient distance to prevent an animal gaining foothold thereon, but are not so spaced as to allow the animal's hoof to pass between them or to become wedged. While the bars 4 are here illustrated as of such length as to extend over three of the ties, it will, of course, be understood that they may be made longer or shorter as may be desired. The movable or yieldable portions of the intermediate section are arranged at each end of the fixed portion above described, and each of the movable portions consists of parallel tread bars 6 which extend in parallel relation and in alinement with the bars 4. The bars 6 are of the same cross sectional form as the bars 4 and at their free ends are connected by a cross piece 7. Inwardly of their free ends the bars are connected by a cross bar 8 secured to their under sides and extending transversely of the series of bars. A pivot rod 9 is fitted through the inner ends of the bars 6 in the manner clearly shown in Figs. 1 and 3 of the drawings, and at its ends this rod is mounted in upstanding bracket ears 10 carried by a plate 11 secured upon that one of the ties upon which one of the end ones of the attaching plates 3 of the fixed portion is mounted. In this manner the bars 6 comprising the movable portion of the intermediate section of the guard are mounted for swinging movement, and it will be apparent that when an animal treads upon the bars, the said movable portion as a whole will be swung downwardly, thereby preventing the animal gaining foothold upon the guard. In order that the movable portion may be normally held raised or in the position shown in Fig. 3 of the drawings, a spring is employed in connection with each of the portions and is preferably formed with spaced members 11' and a connecting portion 12 which extends beneath one of the bars 6, as shown in Fig. 1, the members 11' being coiled as at 13 about the pivot rod 9 and having their ends secured to the respective bracket plate. In order to limit the upward swinging movement of the movable portions of the intermediate section, stop fingers 14 are secured upon a block 15 mounted upon that one of the ties beside which the cross piece 7 extends. It is preferable that the block 15 be provided with inclined upper faces 16 so as to assist in preventing an animal gaining foothold upon the guard. It will be observed that the movable portions of this section of the guard are arranged one at each end of the fixed portion and that their pivoted ends are located next adjacent the ends of the said fixed portion.

Inasmuch as the side sections of the guard are of counter-part construction a description of one will suffice for both, it being observed that one of these sections is mounted at each side of the intermediate section and upon the projecting ends of the ties. The section consists of two sets of tread bars 17 connected at their ends by cross pieces 18 and it will be observed that the corresponding bars of the two sets extend in alinement, the sets being disposed end to end. A pivot rod 19 is fitted through the bars 17 of each set at a point approximately midway between the ends thereof and transversely of the set, and this rod at its end is mounted in the upstanding ends 20 of a bracket plate 21 secured upon one of the ties 1. A spring having spaced portions 22 and a connecting portion 23 has its said spaced portions coiled about the pivot rod 19 and has its ends beyond the coils secured in the bracket plate 21. The connecting portion 23 of the spring bears against the under sides of a pair of bars, and this spring normally holds the bars comprising each of the members of the section substantially horizontal, it being understood, however, that the end of each member which is located at the end of the guard as a whole may be depressed against the tension of the respective spring. The opposite ends of the members or in other words, their adjacent ends rest upon the upper surface of the tie which is located between the ties upon which the bracket plates 21 are mounted, and this engagement of the adjacent ends of the members of the said tie serves to limit their swinging movement, due to the action of the springs, so that they will normally occupy a substantially horizontal position as stated. At this point it will be apparent that should an animal tread upon any one of the members comprising the side guard sections, that end of the member which is located at the end of the guard as a whole will be depressed and the opposite end will be elevated so that not only will the yielding of the member prevent the animal gaining a foothold on the guard but the elevation of the last mentioned end of the member will appear to the animal as a barrier and will in this way tend to discourage further effort on the part of the animal to cross the guard. In order that the rocking of either member of either of the side sections will cause a corresponding movement of the other end thereof an arm 25 is secured to the under side of one of the bars of each member at the adjacent ends of the members and projects beneath the end of the corresponding bar of the other member as clearly shown in Figs. 1 and 2 of the drawings. It will be understood, of course, that as either member is rocked, the arm carried thereby will ride beneath the bar of the other member and elevate the adjacent end thereof.

It is preferable that the guard be mounted between two winged fences 26 such as are usually employed in connection with cattle guards these fences serving as usual to insure of the animal stepping upon the operative portion of the guard.

Having thus described the invention what is claimed as new is:

1. In a cattle guard, a relatively fixed guard member and a depressible guard member arranged at each end of the fixed member, means yieldably supporting the depressible guard members, a block located adjacent each of the depressible guard members and having an inclined face, and means carried by each block and arranged to limit the upward movement of the respective guard member.

2. In a cattle guard, a supporting bracket comprising a base plate and upstanding ends, a rod mounted in the said upstanding ends of the bracket, a guard section including bars mounted for rocking movement upon the said rod, means connecting the bars, and a spring coiled about the rod and having a portion bearing beneath one of the bars at one side of the said rod.

3. In a cattle guard, guard members mounted for rocking movement and disposed end to end, and a resilient arm projecting from the adjacent end of each member beneath the said end of the other member, whereby depression of the remote ends of either member will result in simultaneous upward swinging movement of the adjacent ends of both members.

4. In a cattle guard, guard members mounted for rocking movement and disposed end to end, and resilient yieldable connection between the adjacent ends of the members, whereby depression of the remote end of either member will result in simultaneous upward swinging movement of the adjacent ends of both members.

In testimony whereof I affix my signature in presence of two witnesses.

WILLIAM J. HICKEY. [L. S.]

Witnesses:
  OSCAR J. SMITH,
  LAURENCE C. BERINGER.